Aug. 18, 1959 J. L. CARROLL ET AL 2,900,608
MODULATING CIRCUITS
Filed Aug. 1, 1955
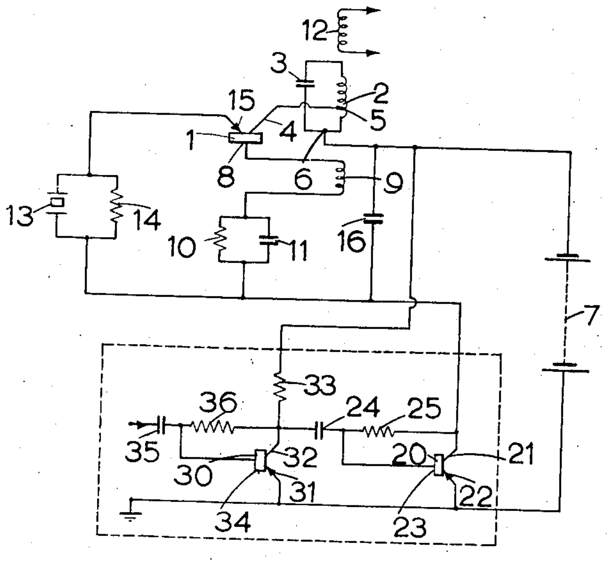
Inventors
J. L. Carroll
J. Ewels
By Glascock Downing & Seebold
Attys.

2,900,608
Patented Aug. 18, 1959

2,900,608

MODULATING CIRCUITS

John Louis Carroll, Ealing, London, and John Ewels, Harrow, England, assignors to Electric & Musical Industries Limited, Hayes, Middlesex, England, a company of Great Britain Application August 1, 1955, Serial No. 525,719
Claims priority, application Great Britain August 5, 1954
3 Claims. (Cl. 332—52)

The present invention relates to circuit arrangements for modulating the amplitude of oscillations.

For the purpose of modulating oscillations generated by an oscillator circuit in which the oscillations are sustained by means of a transistor, two methods have hitherto been tried, namely, the method of choke modulation and the method of transformer modulation. In the first of these a choke is arranged so as to be common to the collector circuits of both the oscillator transistor and another transistor, termed the modulator transistor, to which the modulation signals are applied. In the second method the primary winding of a transformer is connected in the collector circuit of the modulator transistor and the secondary winding is disposed in the collector circuit of the oscillator transistor. Both these arrangements possess disadvantages and an immediately obvious disadvantage is that a choke or transformer tends to be bulky and expensive in comparison with the other components of the circuit. If on the other hand an attempt is made to reduce the bulk then the D.C. resistance of the windings becomes very large leading to a large voltage drop which is wasteful in power. Thus in a suitable miniature modulating transformer the D.C. resistance may be as high as 4,000 ohms and with an oscillator drawing 2.5 milliamps. a drop of 10 volts is produced which is of the order of half the normal battery voltage. Furthermore, such miniaturisation also tends to give a poor frequency response.

Another objection derives from the inequality of operating voltages required for the modulator and oscillator transistors. Normally for the modulator transistor a device of the so-called junction type is employed whereas a point contact transistor is usually chosen for the oscillator. The latter type requires an operating potential for the collector electrode which is some three times that similarly required for junction type and consequently if a choke type modulating circuit is used then the oscillator transistor will be operated with too low a value of the high tension. With a transformer type modulating circuit this difficulty can be overcome by the use of two voltage sources of different voltages but this is clearly undesirable. The difficulty can also be overcome by arranging a dropping resistance in series with the modulator transistor but again this is undesirable since the dropping resistance results in waste of power.

One object of the present invention is to provide an improved modulating circuit arrangement employing transistors which reduce the disadvantages indicated and at the same time facilitates the attainment of substantially linear modulation.

Another object of the present invention is to provide an improved modulating circuit in which the frequency of the oscillations to be modulated is crystal controlled and in which provision is made to reduce the restriction of the modulation band width which would otherwise tend to arise due to the use of a crystal.

According to the present invention there is provided a modulating circuit arrangement comprising oscillation means and modulation means, said oscillation means including a first transistor operative to sustain the generated oscillation, said modulation means comprising a second transistor, the path from the collector electrode to another electrode of said second transistor being in series with the collector circuit of said first transistor and apart from the base electrode-to-emitter circuit thereof, circuit connections for applying modulation signals to the emitter-base circuit of said second transistor to cause the collector current of said second transistor to modulate the collector current of said first transistor, thereby modulating the amplitude of said generated oscillations.

In order that the invention may be clearly understood and readily carried into effect, the same will now be described by way of example with reference to the single figure of the accompanying drawing which shows an arrangement in accordance with the invention..

In this figure the reference numeral 1 designates a point contact transistor which is employed for the purpose of generating high frequency oscillations in the tuned circuit formed by the inductance 2 and tuning condenser 3. For this purpose the collector electrode 4 of the transistor is connected to the tapping point 5 on the inductance 2 and the end 6 of the inductance is connected to the negative terminal of a voltage source shown conventionally as a battery 7, the positive terminal of which is grounded. Furthermore, the inductance 2 is coupled with the base electrode 8 of the transistor by means of the coupling coil 9. As shown one end of the coupling coil is connected directly to the base of the transistor and the other end of the coupling coil is connected to a biasing circuit formed by the resistor 10 shunted by the capacitor 11. The coil 12, also coupled with the inductance 2, provides an output of the high frequency oscillations produced by the arrangement, these oscillations being modulated in amplitude as will appear subsequently. In order to stabilise the frequency of said oscillations there is included in the emitter circuit of the transistor 1 a piezo electric crystal 13 which as shown is shunted by a biasing resistance 14. One terminal of the crystal 13 is connected directly to the emitter electrode 15 of the transistor and the other terminal is connected to the end of the biasing circuit 10, 11 remote from the base electrode 8. Between this end of the biasing circuit and the negative terminal of the battery 7 there is connected a high tension decoupling condenser 16.

For the purpose of modulating the amplitude of the oscillations set up in the tuned circuit 2, 3, there is provided a modulator transistor shown as 20, having collector electrode 21, emitter electrode 22 and base 23. The emitter electrode 22 is grounded and the collector of the transistor 20 is connected in series with the collector circuit of the oscillator transistor 1. Thus the terminal of the bias circuit 10, 11 remote from the base 8 of the transistor 1 is connected to the collector 21 of the transistor 20. Modulating potentials are applied to the base 23 of the transistor 20 via a coupling condenser 24 and a suitable bias for the base 23 is provided by connecting a resistance 25 of appropriate magnitude between the base electrode and the collector electrode 21.

It will be apparent therefore that in the arrangement shown in the drawing the path from the collector of the transistor 20 to another of its electrodes is connected in series with the collector circuit of the transistor 1 and apart from the base electrode-to-emitter circuit thereof, so that modulating signals applied to the base of the transistor 20 vary the collector current of the transistor 20 and thereby modulate the collector current of the transistor 1. The modulating signals may if desired be applied to the emitter of the transistor 20, the base being connected to earth. By connecting the path from the collector of the transistor 20 to another of its electrodes in series in the collector circuit of the transistor 1 and apart from the base-to-emitter circuit thereof, the modulation of the collector current of the transistor 1 is caused directly by variations of collector current of the transistor 20, and not through the intermediary of variations of the emitter-to-base current of the transistor 1, so that substantially linear modulation can be obtained. Moreover as the crystal is located in a part of the circuit, namely the emitter-to-base circuit of the transistor 1 in which there is substantially no modulating current, the tendency which the crystal would otherwise have to restrict the modulation band width is substantially avoided.

The transistor 1 may be of the point contact type such as the OC51 or may be of a junction type capable of sustaining radio frequency oscillations and the transistor 20 may be of the junction type such as OC10. Suitable component values may be as follows:

| | | |
|---|---|---|
| Resistor 10 | ohms | 3.9K |
| Resistor 14 | do | 8.2K |
| Resistor 25 | do | 47K |
| Capacitor 11 | pf | 1500 |
| Capacitor 16 | pf | 3300 |
| Capacitor 24 | μfd | 8 |

A suitable value for the voltage of the source 7 is 20 volts, an in these circumstances a modulating signal of 0.5 volt R.M.S. applied via the coupling condenser 24 is capable of fully modulating the transistor oscillator. This corresponds to a 5 volts R.M.S. modulating signal appearing between the collector and base of the transistor 1. The modulation is found to be substantially linear. The D.C. voltage drop between collector and emitter of the modulator transistor 20 is about 7 volts.

In order to increase sensitivity, the modulating circuit may be provided with an amplifying stage including a transistor 30 arranged with its emitter 31 connected to ground and its collector 32 connected to the coupling condenser 24 so that the base electrode of modulating transistor 20 is driven via the coupling condenser, the collector electrode 32 being also connected to the negative terminal of the battery 7 via a suitable load resistor 33.

Driving signals are applied to the base 34 of transistor 30 via a coupling condenser 35 and bias for the base electrode is provided by means of the resistor 36 connected between the collector 32 and the base 34. With such an arrangement the transistor 1 may be fully modulated by a driving voltage of approximately 0.015 volt R.M.S.

What we claim is:

1. A modulating circuit arrangement comprising oscillation means and modulation means, said oscillation means comprising a first transistor operative to sustain the generated oscillations and a piezo electric crystal connected in the emitter to base circuit of said first transistor and operative to stabilise the frequency of said oscillations, said modulation means comprising a second transistor, the internal path from the collector electrode to another electrode of said second transistor being in series with the collector circuit of said first transistor and apart from the base-emitter circuit thereof and circuit connections for applying modulation signals to the emitter-base circuit of said second transistor to cause the collector current of said second transistor to modulate the collector current of said first transistor, thereby modulating the amplitude of said generated oscillations.

2. A modulating circuit arrangement comprising a transistor, an input circuit including the path between two electrodes of said transistor, an output circuit including the path between one of said electrodes and a third electrode of said transistor and regeneratively coupled to said input circuit to render oscillations in said output circuit self-sustaining, and means coupled in said output circuit operative to modulate the amplitude of oscillations generated in said output circuit, and a piezoelectric crystal connected in a part of said input circuit which is not common to said output circuit, thereby stabilising the centre frequency of the oscillations generated in said output circuit.

3. A modulation circuit arrangement comprising a first transistor having a base electrode, an emitter electrode and a collector electrode, a second transistor having a base electrode, an emitter electrode and a collector electrode, a resonant circuit, a potential source, means connecting said circuit, said source and the internal path from the collector electrode of said second transistor to another of said electrodes thereof in series in a path from the collector electrode of said first transistor to the emitter thereof, the collector electrode of said first transistor being connected via said source to said other electrode of said second transistor, and an external circuit from the emitter electrode to the base electrode of said first transistor separate from said internal path and including means regeneratively coupled to said resonant circuit, and an emitter base circuit for said second transistor for applying modulatiing signals to produce amplitude modulation of oscillations in said first transistor.

References Cited in the file of this patent

UNITED STATES PATENTS

| | | |
|---|---|---|
| 2,663,800 | Herzog | Dec. 22, 1950 |
| 2,757,287 | Stanley | July 31, 1956 |
| 2,770,731 | Bopp et al. | Nov. 13, 1956 |
| 2,810,110 | Paz | Oct. 15, 1957 |